Oct. 4, 1932.  G. KUWADA  1,881,280
METER FOR GAS FLOW
Filed Oct. 24, 1930
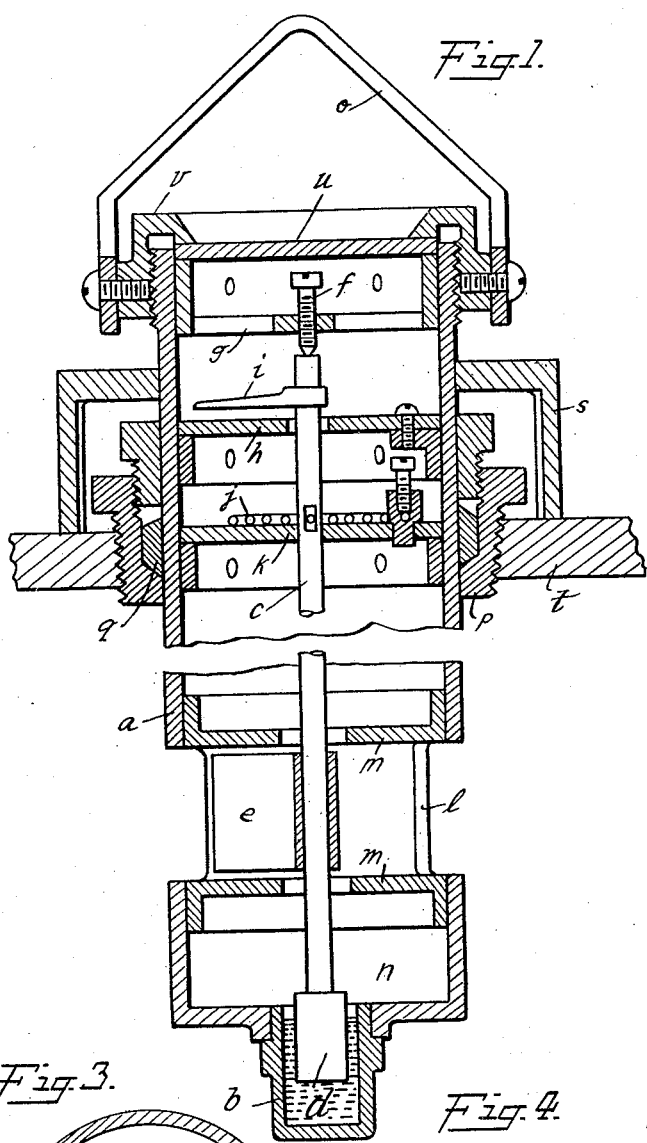
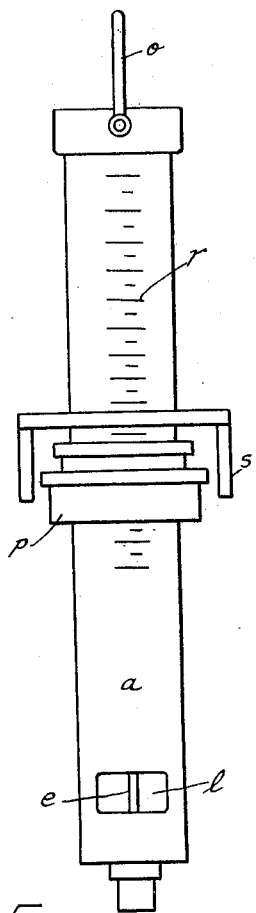
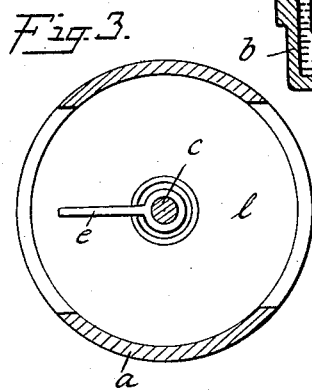
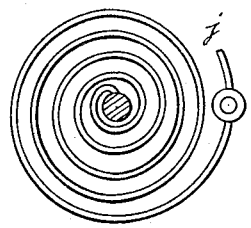
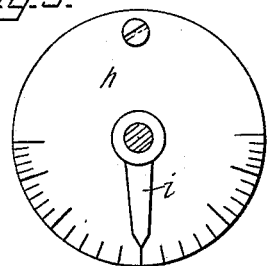
INVENTOR
Gompei Kuwada
BY Pennie Davis Marvin & Edmonds
ATTORNEYS Patented Oct. 4, 1932

1,881,280

UNITED STATES PATENT OFFICE

GOMPEI KUWADA, OF KOMEDANI-MURA, KAWABE-GUN, JAPAN

METER FOR GAS FLOW

Application filed October 24, 1930, Serial No. 490,962, and in Japan September 13, 1930.

My invention relates to an improvement in indicating method for gas flow.

The object of this invention is to indicate the direction of flow of gas passing through a pipe and the force of the current which expresses a degree of speed and eventually quantity of a gaseous body flowing through a known size of pipe in a set period.

Fig. 1 is a vertical cross section of the instrument and Fig. 2 an elevation of the same to which this invention is applied.

Fig. 3 is a horizontal cross section through the passage for gas, Fig. 4 is a plan of a resistance spring and Fig. 5 is a plan of a graduated disk with its index finger.

(a) is the cylindrical body of the instrument, (b) a mercury cup in which is made to float a buoy (d) and rod (c).

On the rod (c) there is attached a vane (e), and at the top, a screw (f) adjusted on the disk (g) is provided to keep the buoy (d) properly immersed in (b).

(h) is an index plate graduated in degrees, (i) being its index finger.

(j) is a spiral spring, one end of which is attached to the rod (c) and the other end to its supporting disk (k), the length of the working part of the same spring being adjustable by means of a set screw as shown on Fig. 4.

(p) is the plug by which the instrument may be inserted into a pipe, (q) being the stuffing box to avoid leakage past the cylindrical body (a).

This cylindrical body is graduated as at (r) and a ring (s) is provided to show the depth to which the instrument may be inserted into a pipe. This indication being necessary to locate the vane (e) at the centre of the pipe.

(o) is a sling by which the instrument is suspended while being inserted into or withdrawn from the pipe.

(m) are disks the purpose of which is to direct the gas flow normal to the face of the vane (e), at its initial position, and also to provide a space (n) into which the mercury in (b) may flow and there rest when the instrument is laid on its side, (l) is the aperture in the cylindrical body (a) through which gas is made to flow.

(t) is the pipe into which the instrument is shown inserted for indication.

(u) is a glass cover held in place by a screw nut (v) to prevent issue of gas.

The instrument when inserted into a pipe as shown on Fig. 1 and the gas flowing through the pipe is made to pass through the aperture (l), the vane (e) will be deflected in the direction of the flow as may be indicated by the index (i).

The force of the current or its resultant impinging on the vane (e) is resisted by the spiral spring (j), the resultant force received on the surface of the vane being equal to the force deflecting the spiral spring. The graduation on the index plate may be either in degrees or lines indicating the quantity of gas flow.

With a known specific gravity of gas the force of current has a certain mathematical relation to its velocity, and the velocity times the known area of the pipe cross section gives the quantity.

So the resultant force impinging on a vane of fixed area may be made to act on a spring resistance and the deflection of the spring calibrated by experiments marked on the index plate gives the direct reading in quantity of gas flow.

Having thus described my invention what I claim is:—

Apparatus for indicating the rate of flow of gas passing through a gas pipe, comprising a casing, a mercury cup therein, a float in said cup, a rod extending upwardly from said float, a vane of predetermined size attached to said rod, said casing having openings whereby the flow of gas may deflect said vane, a spring member of predetermined torsional strength arranged to resist said deflection, and means co-operating with said rod for indicating the quantity of gas flowing through said pipe in a given period of time.

In testimony whereof I have fixed my signature.

GOMPEI KUWADA.